United States Patent [19]

Caimi

[11] Patent Number: 4,570,204

[45] Date of Patent: Feb. 11, 1986

[54] ADJUSTABLE FOCUS LAMP

[75] Inventor: Frank M. Caimi, Vero Beach, Fla.

[73] Assignee: Mine Safety Appliances Company, Pittsburgh, Pa.

[21] Appl. No.: 701,076

[22] Filed: Feb. 13, 1985

[51] Int. Cl.[4] .......................... F21V 7/00; F21V 5/00; G03B 15/02

[52] U.S. Cl. .......................................... 362/17; 362/18; 362/308; 362/318

[58] Field of Search ................... 362/17, 307, 308, 18, 362/276, 280, 318, 16

[56] References Cited

U.S. PATENT DOCUMENTS 4,068,931 1/1978 Weaks ................................ 362/343

4,323,952 4/1982 Proske .................................. 362/17

*Primary Examiner*—E. Rollins Cross

[57] ABSTRACT

The degree of diffusion of a light source can be varied by surrounding the light source with a liquid crystal cell. The light source is positioned at the focal point of a reflector and the liquid crystal cell surrounds the light source. When the cell is unexcited, the light rays which emanate from the source are virtually unaffected as they pass through the cell striking the wall of the reflector. In this state the light rays are projected nearly straight out of the reflector, providing illumination for objects at great distances from the source. When the cell is excited, scattering occurs and the light rays are diffused as they are re-emitted from the liquid crystal. The diffusion shifts the apparent light source points away from the focal point. This diffusing effect causes the light which is projected from the reflector to illuminate a wide area in close proximity to the lamp. The degree of diffusion may be electronically varied to provide optimum illumination for objects at any distance from the reflector.

1 Claim, 3 Drawing Figures

ADJUSTABLE FOCUS LAMP

BACKGROUND OF THE INVENTION

The use of liquid crystal cells (LCC) for the diffusion of light is well known in the field of optics. Assouline, U.S. Pat. No. 3,718,381, Peterson, U.S. Pat. No. 3,937,561 and Sinclair, U.S. Pat. No. 4,364,639, all disclose various uses and arrangements for the diffusion of light by LCC's.

In addition, Proske, U.S. Pat. No. 4,323,952, discloses an LCC lens arrangement which provides instantaneous light diffusion for camera flash equipment. Proske's arrangement is comprised of a reflector cone, a light source and an LCC lens. In this arrangement, the LCC covers the entire open end of the reflector, so that the diffusing element is positioned in a path between the light source and the object to be illuminated. Proske also provides a means whereby the diffusion level can be changed by varying the voltage which is applied to the lens.

There are several disadvantages to this arrangement. First, since the configuration employs a rapidly dissipating light source (flashbulb) in the reflection system, illumination occurs so rapidly that it can not be accurately sensed by the eye. As a result, the instantaneous diffusion, caused by the lens, is beneficial only when using a film-sensitive device such as a photographic camera. Secondly, the LCC must be large enough to cover the entire front opening of the reflector. Since the cell is large, it is expensive to manufacture and replace. This is especially disadvantageous since the LCC is exposed to being damaged, especially in a working environment. And finally, since the LCC is used as a front lens, the light rays are diffused only as they leave the reflector. Thus, only a moderate degree of light control is possible.

SUMMARY OF THE INVENTION

The primary objective of the invention is to provide an adjustable focus lamp having an electrical means for the control of light illumination angles, which are emitted from a reflective surface, so as to lessen eye fatigue when using artificial illumination in mining or other environments.

According to a preferred embodiment of the invention, the lamp is comprised of a reflector; a light source located at the focal point of the reflector; a liquid crystal cell (LCC) surrounding the light source, positioned between the light and reflector wall; and a means of applying variable voltage to the LCC. In this configuration, the LCC intercepts substantially all of the light rays, which are emitted from the source, before they strike the reflector walls.

By positioning the LCC around the source, the effective size of the source is made larger when the cell is electronically excited. The size of the source appears to increase to the size of the panel assembly, since the light, which is emitted from the source, is re-emitted from the liquid crystal molecules as though each were a point source of light and is thereby scattered. This shifts the apparent position of the source to points away from the focal point, thereby creating a more diffuse source of light. Thus, the apparent position of the source and the degree of scattering can be altered electronically by exciting the LCC.

When the LCC is in an unexcited state, the light source is located at the focal point of the reflector.

Under this condition the projected light beams from the reflector are highly collimate. Collimate light beams are useful for illuminating objects at a great distance from the source.

When the LCC is excited, scattering occurs and the apparent position of the source points is shifted away from the focal point. As a result, the light flux is diffused inside of the reflector. This greatly reduces the degree of collimation by causing the light rays to alter their projected light pattern. The scattered beams are then reflected in a jumbled array, causing illumination of a wide area in close proximity to the adjustable focus lamp.

The degree of scattering can be changed by varying the voltage which is applied to the LCC. Generally, as the voltage is increased, the degree of scattering is increased. Scattering may range from low degrees, where the light is projected in straight beams for long distance illumination, to high degrees where the light rays are jumbled to illuminate wide areas in close proximity to the lamp fixture. The LCC may be activated by applying a variable voltage AC source, preferably a square wave.

One use of the adjustable focus lamp may be, but is not limited to, its use as a miner's caplamp. A typical miner's caplamp is comprised of a light bulb inside a reflector which is covered with a lens. When the bulb is lit, light beams are reflected off the inner walls of the reflector and projected with a high degree of collimation out of the front of the lamp. This arrangement is effective when using the lamp to illuminate objects at a great distance from the miner. Since much of the miner's work is performed in close proximity to the miner, it is desirable to illuminate a wide area directly in front of the miner. By increasing the degree of scattering, the projected light with is emitted from the caplamp illuminates a much broader area directly in front of the miner.

Other features and advantages of the invention will be better understood after consideration of the following description, offered by way of non-limiting example, and from the attached drawings.

DESCRIPTION OF THE PREFERRED EMBODIMENTS

Figure 1:
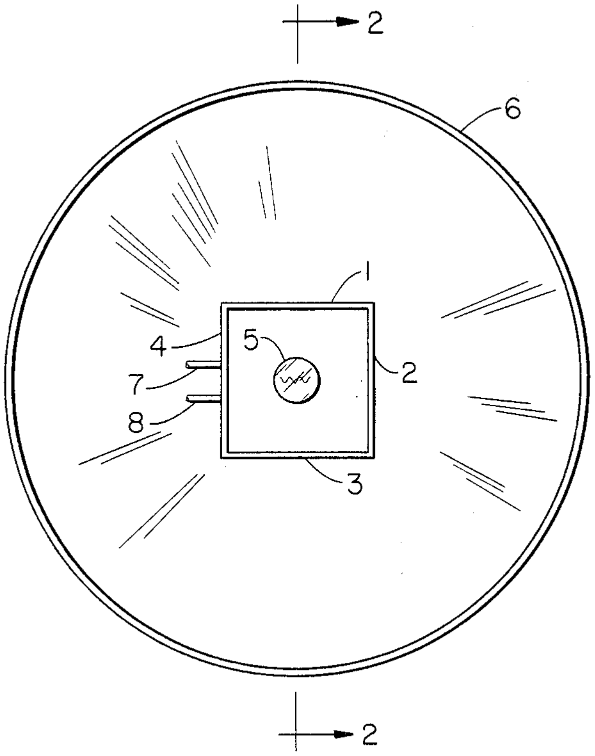
FIG. 1 is a schematic frontal view of the lamp of this invention.
Figure 2:
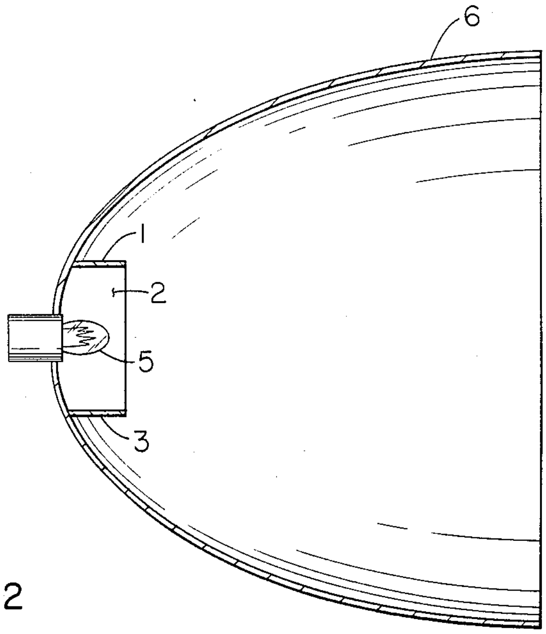
FIG. 2 is a sectional view along base 202 of FIG. 1.
Figure 3:
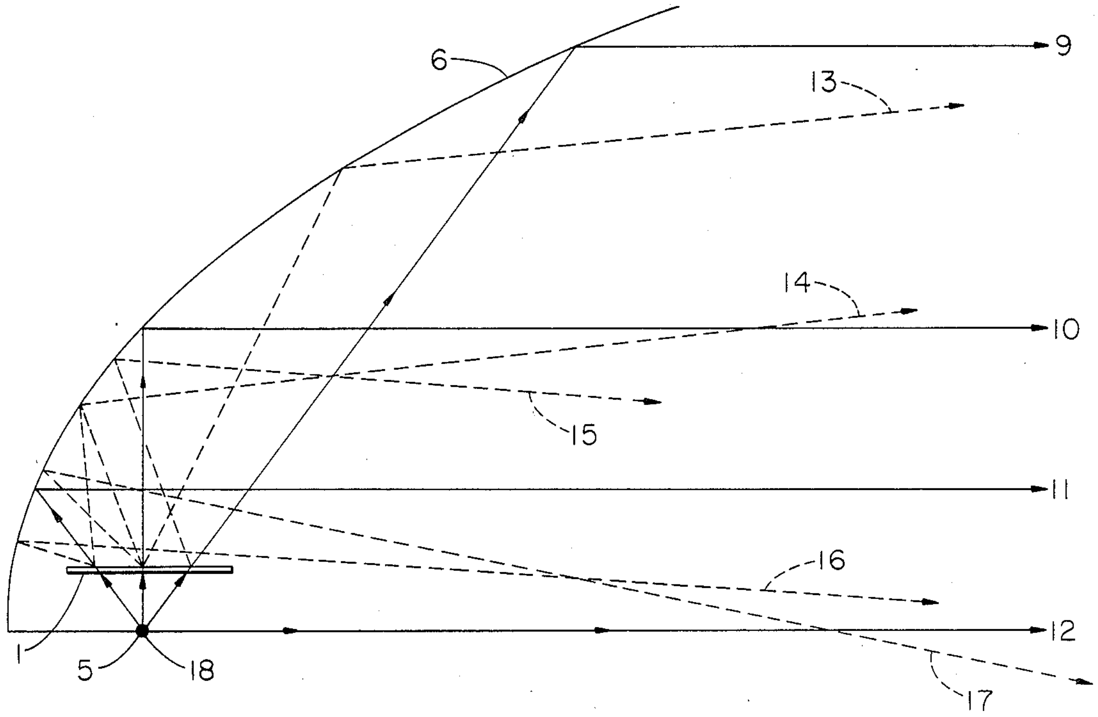
FIG. 3 is a schematic diagram of the action of the light rays in one quadrant of the lamp.

With reference to FIG. 1, FIG. 2 and FIG. 3, the electronically controllable light diffuser system essentially comprises four liquid crystal cells (LCC) 1, 2, 3, 4 which surround a light source 5. The four LCC's 1, 2, 3, 4, are connected in parallel by means of two electrode lead wires 7 and 8. A variable voltage AC source is connected across the inner or outer electrode busses to provide excitation voltage to the cells. The entire diffuser assembly is surrounded by a paraboloidal reflector. The light source is located inside the reflector at the focal point 18.

Referring to FIG. 3, when the light source 5 is switched on and the LCC is not excited, light flux emanates from the source 5 through LCC 1 to the wall of the reflector 6 and is projected out of the reflector in collimate light rays as represented by lines 9, 10, 11 and 12. When the LCC is excited, some light rays are absorbed and re-emitted from the LCC causing the rays to deviate from a collimated pattern as represented by dotted lines 13, 14, 15, 16 and 17. The deviation of the rays spreads the divergence of the projected beam to illuminate a wide area directly in front of the reflector. The proportion of light intercepted and scattered depends on the degree of excitation of the LCC, which can be continuously varied from zero to maximum excitation.

I claim:

1. An adjustable focus lamp comprising:

a reflector;

a light source positioned at the focal point of the reflector;

a liquid crystal cell surrounding the light source that intercepts substantially all of the light flux emitted by the source to the reflector; and means to apply variable voltage to the liquid crystal cell.

* * * * *